(12) United States Patent
Brouwer et al.

(10) Patent No.: US 8,397,901 B2
(45) Date of Patent: Mar. 19, 2013

(54) EXTENDABLE BOOM BRAKE APPARATUS AND SYSTEM

(75) Inventors: David J. Brouwer, Flower Mound, TX (US); Jeffrey D. Price, Coppell, TX (US)

(73) Assignee: Siemens Industry, Inc., Apharetta, GA (US)

( * ) Notice: Subject to any disclaimer, the term of this patent is extended or adjusted under 35 U.S.C. 154(b) by 0 days.

(21) Appl. No.: 13/156,820

(22) Filed: Jun. 9, 2011

(65) Prior Publication Data
US 2011/0315518 A1 Dec. 29, 2011

Related U.S. Application Data

(60) Provisional application No. 61/358,032, filed on Jun. 24, 2010.

(51) Int. Cl.
*B65G 15/26* (2006.01)

(52) U.S. Cl. .......................... 198/588; 198/313; 198/812

(58) Field of Classification Search ................... 198/812, 198/588, 313
See application file for complete search history.

(56) References Cited

U.S. PATENT DOCUMENTS

| | | | | |
|---|---|---|---|---|
| 3,282,403 A | * | 11/1966 | Todd | 198/812 |
| 4,624,357 A | * | 11/1986 | Oury et al. | 198/313 |
| 5,525,026 A | * | 6/1996 | DeMonte et al. | 414/542 |
| 6,003,658 A | * | 12/1999 | Best et al. | 198/588 |
| 2002/0153229 A1 | * | 10/2002 | Gilmore et al. | 198/568 |

* cited by examiner

*Primary Examiner* — James R Bidwell

(57) ABSTRACT

An extendable boom conveyor system and method. The extendable boom system includes first and second boom elements, an operator control, and a controller. The first boom element includes a brake mechanism, which includes a pin configured to be positioned in an engaged position and a disengaged position. The second boom element includes a feature configured to engage the pin in the engaged position and prevent motion of the first boom element relative to the second boom element in at least a first direction. The controller is configured to receive an operator signal from the operator control and activate the brake mechanism responsive to the operator signal.

20 Claims, 5 Drawing Sheets

EXTENDABLE BOOM BRAKE APPARATUS AND SYSTEM

CROSS-REFERENCE TO RELATED APPLICATIONS

The present application is related to, and claims priority to, U.S. Provisional Patent Application No. 61/358,032, filed Jun. 24, 2010, which is hereby incorporated by reference into the present application as if fully set forth herein.

TECHNICAL FIELD

The present disclosure is directed, in general, to mail and parcel processing techniques.

BACKGROUND OF THE DISCLOSURE

Improved and more efficient systems for unloading parcels and other items from a container or trailer are desirable.

SUMMARY OF THE DISCLOSURE

Various disclosed embodiments include an extendable boom conveyor system and method. In one embodiment, an extendable boom includes first and second boom elements. The first boom element includes a brake mechanism, which includes a pin configured to be positioned in an engaged position and a disengaged position. The second boom element includes a feature configured to engage the pin in the engaged position and prevent motion of the first boom element relative to the second boom element in at least a first direction.

In another embodiment, an extendable boom system includes first and second boom elements, an operator control, and a controller. The first boom element includes a brake mechanism, which includes a pin configured to be positioned in an engaged position and a disengaged position. The second boom element includes a feature configured to engage the pin in the engaged position and prevent motion of the first boom element relative to the second boom element in at least a first direction. The controller is configured to receive an operator signal from the operator control and activate the brake mechanism responsive to the operator signal.

In still another embodiment, a method for use with an extendable boom system including first and second boom elements includes receiving an operator signal from an operator control. The method also includes activating a brake mechanism responsive to the operator signal. The brake mechanism is coupled to the first boom element and includes a pin configured to be positioned in an engaged position and a disengaged position. The second boom element includes a feature configured to engage the pin in the engaged position and prevent motion of the first boom element relative to the second boom element in at least a first direction.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Extendable loaders are often implemented at loading docks for trucks, trailers or the like. Some extendable loaders (referred to as "gravity loaders") are extendable into a truck/trailer or other container and angled downward such that gravitational forces cause packages to move down the loaders along a plurality of rollers. Other extendable loaders include a powered conveyor belt or other transport mechanism, which may be used to move packages into or out of a container.

The loaders may be extended to reach further into the trailer, in order to minimize the manual lifting and carrying of the packages, and retracted to a stored position to minimize the space taken up by the loader when not in use. However, because of the substantial size and weight of these loaders, extension and retraction is often accomplished by powered extension and retraction systems, which are typically complicated and expensive devices. The powered extension and retraction systems are often used to stop and hold the loader at the desired degree of extension. In other loaders, devices are arranged to apply additional friction to sliding or rolling elements of the loader in order to resist extension of the loader or to lock the loader in its current position.

Figure 1:
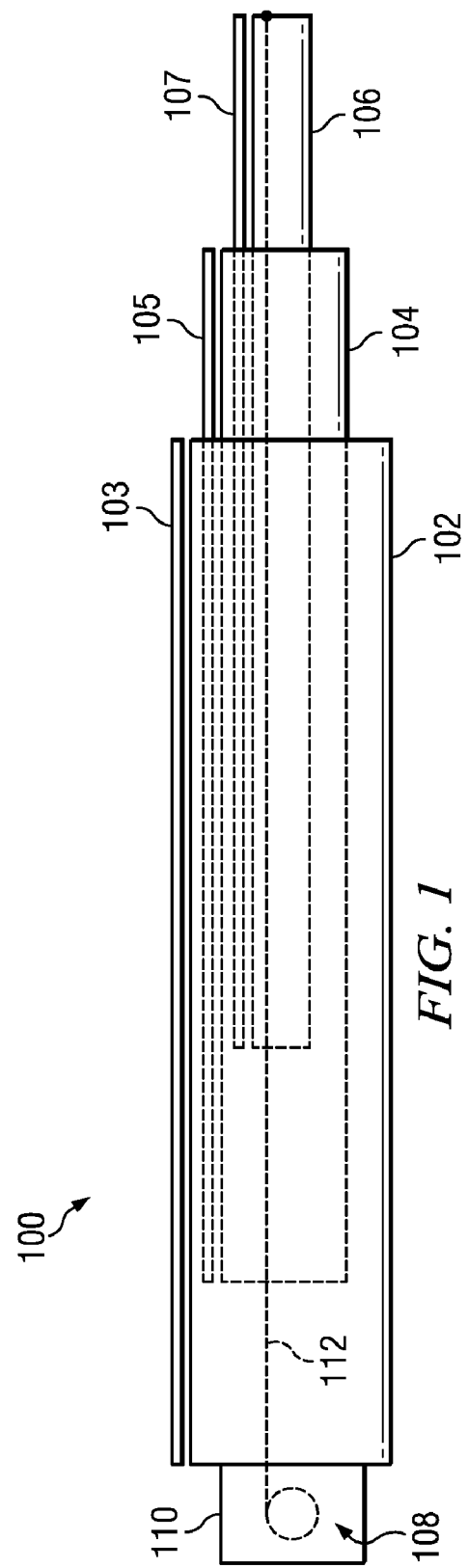
FIG. 1 depicts a schematic diagram of an extendable boom apparatus.

FIG. 1 depicts a schematic diagram of an extendable boom conveyor system 100. A rear boom element 102 encloses portions of a middle boom element 104 and a front boom element 106. As shown in FIG. 1, the boom apparatus 100 is in a substantially retracted configuration, with the middle boom element 104 and the front boom element 106 substantially retracted within the rear boom 102. Conveyor apparatuses 103, 105 and 107 are included on sides of the boom elements 102, 104 and 106, respectively, such that items may pass from one to another of the conveyor apparatuses 103, 105 and 107 along the extendable boom conveyor system 100 into or out of a container. In some embodiments, the conveyor apparatuses 103, 105 and 107 include one or more of wheels, rollers, or low friction surfaces, to allow items to move by gravity into or out of a container. In other embodiments, the conveyor apparatuses 103, 105 and 107 may include one or more powered strips or belts that carry items into or out of a container. In still other embodiments, a single conveyor apparatus may extend along the upper surfaces of some or all of the boom elements 102, 104 and 106, and extend and retract along with the boom elements 102, 104 and 106.

Extension and retraction of the boom apparatus 100 may be accomplished by a boom drive mechanism 108, comprising a winch 110 and cable 112 extending through the rear boom element 102 and the middle boom element 104 into the front boom element 106. In other extendable boom apparatuses, the force of gravity may be used to extend and/or retract the boom apparatus. In still other extendable boom apparatuses, other powered boom drive mechanisms may be employed.

If a failure occurs in the drive mechanism 108, one or more of the boom elements 102, 104 and 106 may be free to move in an unconstrained way under the force of gravity or another outside force. Such unconstrained motion may create a dangerous situation in a trailer or other container in which the boom apparatus 100 is deployed, with the risk of damage to the contents of the trailer or injury or death to personnel working in the trailer.

The boom apparatus 100 may include a brake mechanism that operates by limiting the rotation of one or more support rollers of one or more of the boom elements 104 and 106. Such a brake mechanism relies on friction to stop the movement of one boom inside the other. The amount of braking force generated by the friction is typically dependent on the load seen at the roller and the coefficient of friction between the roller and the surface it rides on. Both the load and the coefficient of friction are variable, depending on the conditions present at the time the brake is applied. These conditions can allow for inconsistent braking effect of such a friction-based boom brake.

Figure 2:
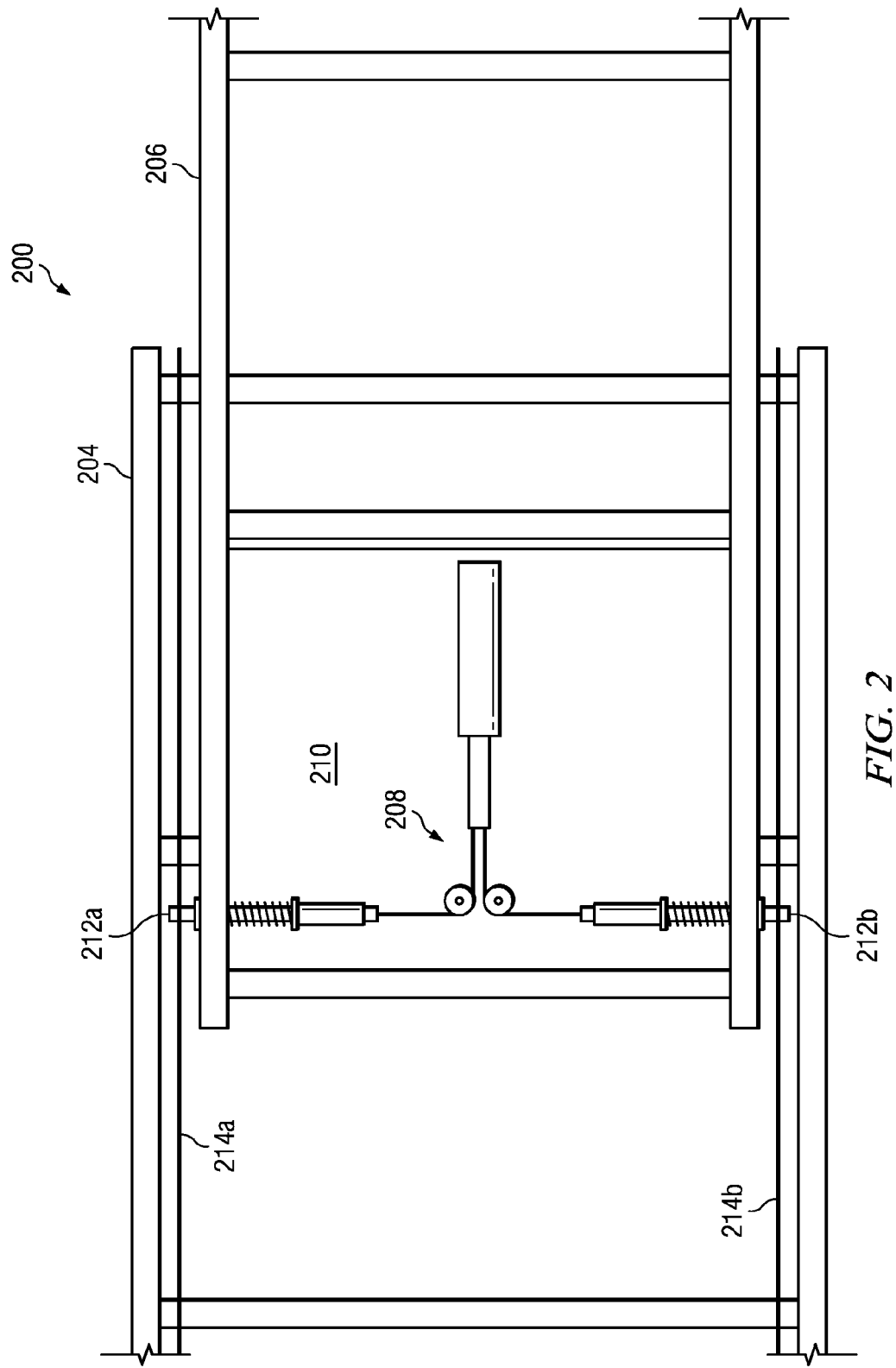
FIG. 2 depicts a schematic top view of an extendable boom and brake apparatus according to disclosed embodiments.

FIG. 2 depicts a schematic top view of an extendable boom and brake apparatus 200 according to disclosed embodiments that can form part of an extendable conveyor system for parcels and other items. While the apparatus 200 includes conveyor apparatuses such as elements 103, 105 or 107 of FIG. 1, these elements are not shown in FIG. 2 for clarity, in order to expose other elements of the apparatus 200. The apparatus 200 includes a first boom 204 and a second boom 206. In some embodiments, the booms 204 and 206 correspond to the middle boom element 104 and front boom element 106 of the extendable boom 100 shown in FIG. 1. In other embodiments, the boom elements 204 and 206 correspond to the rear boom element 102 and middle boom element 104 of the extendable boom 100 shown in FIG. 1. It will be understood that in some embodiments, a single brake mechanism according to the disclosure may be used to stop movement of all boom elements of the extendable boom apparatus. In other embodiments, a plurality of such brake mechanisms may be employed in a corresponding plurality of positions to stop movement of a desired number of boom elements of the extendable boom apparatus.

Mounted to the second boom element 206 is a platform 210, on which is mounted a brake apparatus 208 according to the disclosure. In other embodiments, the brake apparatus 208 may be mounted to the second boom element 206 by another suitable mounting mechanism. The brake apparatus 208 will be explained in greater detail with reference to FIGS. 3A and 3B. The brake apparatus 208 includes pins 212a and 212b, which are extended through slotted plates 214a and 214b, respectively. The slotted plate 214a is a structure mounted to a first side of the boom element 204 and the slotted plate 214b is a structure mounted to a second side of the boom element 204. In the configuration shown in FIG. 2, the pins 212a and 212b and the slotted plates 214a and 214b act to reduce or prevent motion of the second boom element 206 relative to the first boom element 204.

FIGS. 3A and 3B depicts schematic views of a boom brake apparatus 300 according to disclosed embodiments in disengaged and engaged configurations, respectively. For simplicity, the brake apparatus 300 is explained with reference to boom elements 204 and 206 of FIG. 2, however, it will be understood that, in other embodiments, the brake apparatus 300 may be used with any other suitable configuration of boom elements of an extendable boom apparatus.

In FIG. 3A, the boom brake apparatus 300 is in a disengaged configuration, wherein relative movement of the first boom element 204 the second boom element 206 is not prevented by the brake apparatus 300. A linear actuator 302 is in a retracted (or first) position, causing a shaft 304 to withdraw into the linear actuator 302. Cables 306 are coupled to the shaft 304. A first cable 306 passes around a portion of a pulley 308a and is coupled to a pin 310a. A second cable 306 passes around a portion of a pulley 308b and is coupled to a pin 310b. The pins 310a and 310b pass through guides 312a and 312b, respectively.

The body of the linear actuator 302 and the guides 312a and 312b are fixedly coupled to the plate 210 of the boom element 206 (not shown), as indicated by ground symbols 320. The remaining elements of the boom brake apparatus 300 are free to move relative to the body of the linear actuator 302 and the guides 312a and 312b. In the disengaged configuration shown in FIG. 3A, the pins 310a and 310b are retracted (or pulled inward) through the guides 312a and 312b, respectively, by the cables 306. In the retracted position, a plate 316a (fixedly coupled to the pin 310a) compresses a spring 314a or other biasing mechanism against a plate 318a (fixedly coupled to the guide 312a), biasing the pin 310a to move outward through the guide 312a. Similarly, a plate 316b (fixedly coupled to the pin 310b) compresses a spring 314b or other biasing mechanism against a plate 318b (fixedly coupled to the guide 312b), biasing the pin 310b to move outward through the guide 312b. The pins 310a and 310b are sensed in the retracted positions by sensors 322a and 322b, respectively.

FIG. 3B depicts the boom brake apparatus 300 in an engaged configuration, wherein relative movement of the first boom element 204 the second boom element 206 is prevented by the brake apparatus 300. The linear actuator is in an extended (or second) position, in which the shaft 304 is extended from the linear actuator 302, allowing the pin 310a to extend through the guide 312a under the biasing force of the spring 314a. The pin 310a passes through the slotted plate 214a, which is mounted to a first side of the boom 204 by spacers 324. The spacers 324 have a length that prevents the end of the pin 310a from contacting the boom 204. Similarly, the pin 310b extends through the guide 312b under the biasing force of the spring 314b. The pin 310b passes through the slotted plate 214b, which is mounted to a second side of the boom 204 by spacers 324. The presence of the pins 310a and 310b in slots of the slotted plates 214a and 214b prevent the boom element 204 from moving relative to the boom element 206 through any distance greater than a length of the slots in the slotted plates 322a and 322b. The slotted plates 214a and 214b will be described in greater detail with reference to FIG. 6.

The linear actuator 302 is an electric cylinder. In other embodiments, an air cylinder, rack-and-pinion mechanism, lead screw or other device may be used in place of the linear actuator 302. As such, the linear actuator 302 may be activated electrically, pneumatically, hydraulically, or by other suitable technique. The term "activate," when used herein with reference to the linear actuator 302, refers to either or both of extending and retracting the shaft 304.

Figure 4:
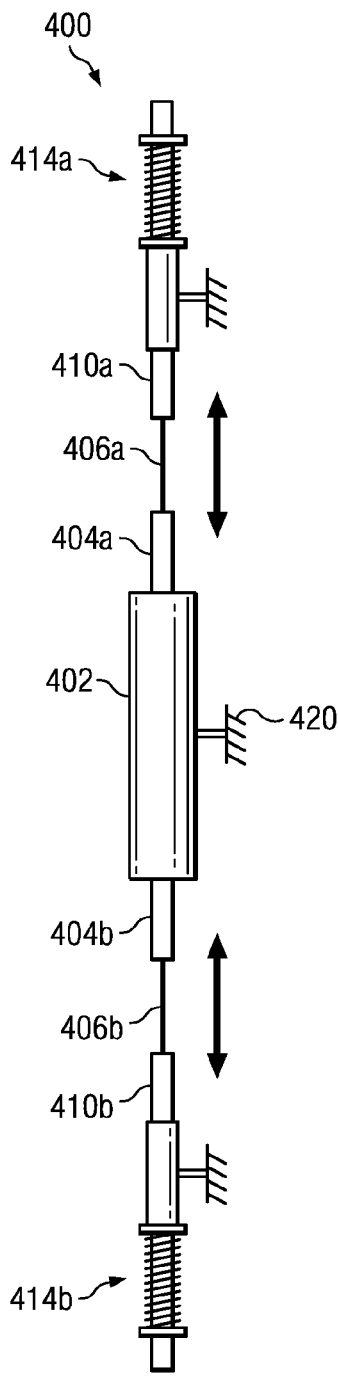
FIGS. 4 and 5 depict schematic views of boom brake activation mechanisms according to disclosed embodiments.
Figure 5:
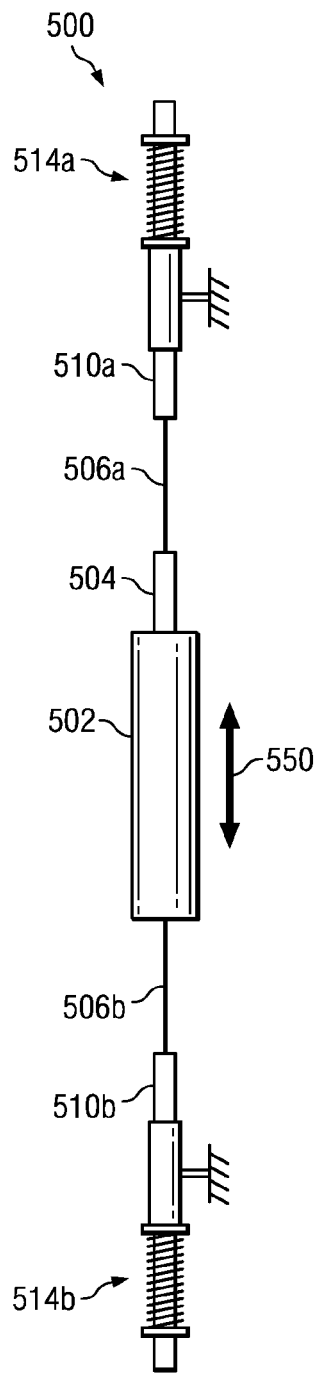

FIGS. 4 and 5 depict schematic views of boom brake activation mechanisms according to disclosed embodiments. FIG. 4 depicts boom brake activation mechanism 400, which includes linear actuator 402 having two shafts 404a and 404b. The shafts 404a and 404b are positioned at opposite ends of the linear actuator 402 and configured to actuate together. In a first configuration, both shafts 404a and 404b are extended from the linear actuator 402. In a second configuration, both shafts 404a and 404b are retracted into the linear actuator 402.

The shaft 404a is coupled to a first end of a cable 406a, while a second, opposite, end of the cable 406a is coupled to a pin 410a. Similarly, the shaft 404b is coupled to a first end of a cable 406b, while a second, opposite, end of the cable 406b is coupled to a pin 410b. The linear actuator 402 is fixedly coupled to a support structure (not shown), as indicated by a ground symbol 420. When the shaft 404a is retracted into the linear actuator 402, the pin 410a is pulled into a position that compresses a spring 414a. When the shaft 404a is extended from the linear actuator 402, the spring 414a expands, causing the pin 410a to move outward from the linear actuator 402. Similarly, when the shaft 404b is retracted into the linear actuator 402, the pin 410b is pulled into a position that compresses a spring 414b. When the shaft 404b is extended from the linear actuator 402, the spring 414b expands, causing the pin 410b to move outward from the linear actuator 402.

FIG. 5 depicts boom brake activation mechanism 500, which includes a linear actuator 502 having a single shaft 504. The shaft 504 is coupled to a cable 506a, which is coupled to a pin 510a. The body of the linear actuator 502 is coupled to a cable 506b, which is coupled to a pin 510b. The linear actuator 502 is not fixedly coupled to a support structure. Instead, the linear actuator 502 is slidably coupled to the support structure and is constrained to move only in the direction indicated by the arrow 550. In this way, as the shaft 504 is retracted into the linear actuator 502, both the cables 506a and 506b are pulled toward the center of the boom brake activation mechanism 500, compressing springs 514a and 514b, and the linear actuator 502 slides to remain centered between the pins 510a and 510b. Similarly, as the shaft 504 is extended from the linear actuator 502, the springs 514a and 514b expand, moving the pins 510a and 510b outward, and the linear actuator 502 again slides to remain centered between the pins 510a and 510b.

Figure 3:
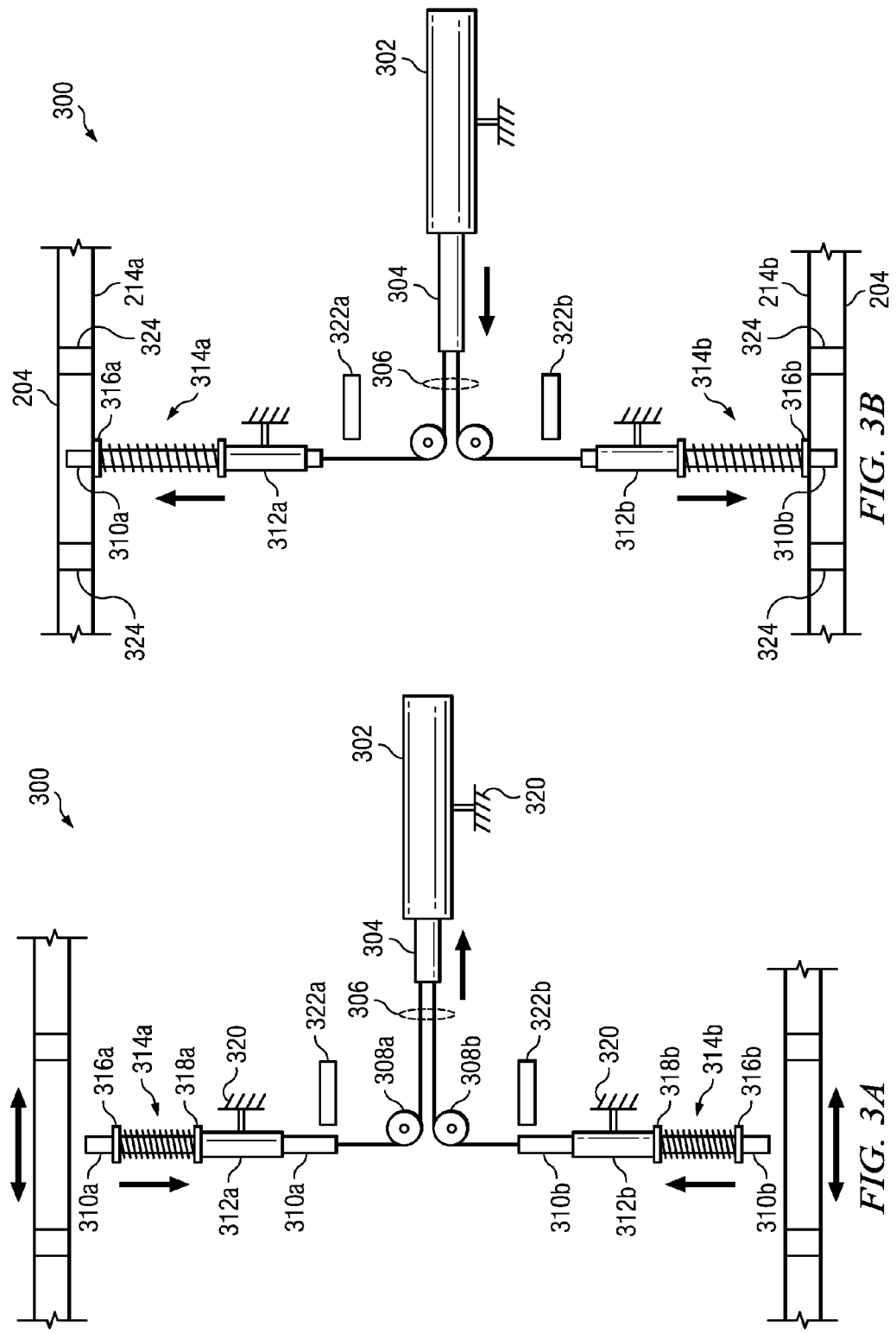
FIGS. 3A and 3B depict schematic views of a boom brake apparatus according to disclosed embodiments in disengaged and engaged configurations, respectively.

While FIGS. 3, 4 and 5 are described with reference to linear actuators, in other embodiments a rotary actuator may be used, with a cam or crank mechanism used to convert the rotary motion of the actuator into linear motion of the pins 310, 410 and/or 510. While FIGS. 3, 4 and 5 show linear actuators linked to the pins using cables, in other embodiments a chain, belt or other linkage may be used. In still other embodiments of the mechanisms shown in FIGS. 4 and 5, the pins may be coupled directly to the shaft and/or body of the linear actuator.

While FIGS. 2-5 show brake apparatuses with two pins, extending from opposite sides of a boom element, it will be understood that in other embodiments, one pin or more than two pins may be used and may be positioned to extend from any suitable surface of the boom element to engage a feature of another boom element. In some embodiments, the drive mechanism of an extendable boom is configured so that preventing relative motion between any two boom elements stops the motion of all boom elements. In other embodiments, boom brake apparatuses according to the disclosure may be installed in all (or all but one) boom elements, to stop extension or retraction of the extendable boom by preventing relative motion between all pairs of boom elements.

Figure 6:
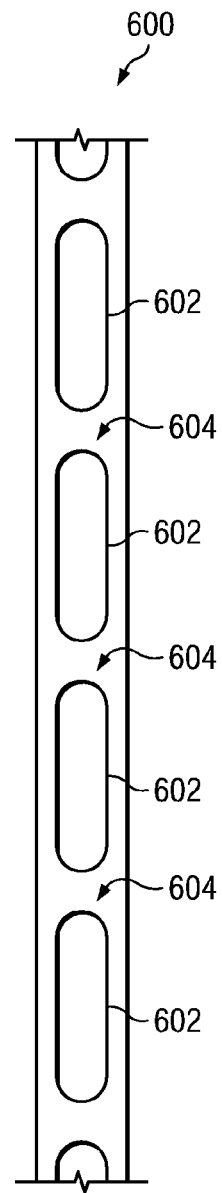
FIG. 6 depicts a schematic view of a slotted plate according to disclosed embodiments.

FIG. 6 depicts a schematic view of a slotted plate 600 according to disclosed embodiments. The slotted plate 600 includes a plurality of slots 602, separated by portions 604 of the material of the slotted plate 600. The slots 602 are configured to receive a pin within the slots 602. In other embodiments, elements 602 may represent other features that engage a pin of the brake mechanism, such as depressions or other hollow features. In still other embodiments, elements 604 may represent barriers or other features that extend from the otherwise flat surface of the plate 600 to engage a pin of the brake mechanism. For all such features of the plate 600, the pin is engaged by a first end of the slot or hollow feature or by a first side of the barrier feature to prevent relative motion of the first and second boom elements in a first direction, while the pin is engaged by a second end of the slot or hollow feature or by a second side of the barrier feature to prevent relative motion of the first and second boom elements in a second direction.

The length of the slots 602 is selected to satisfy two goals. In a first goal, when a pin of a boom brake apparatus is released while the slotted plate 600 is moving at a maximum expected speed, and the pin lands on a portion 604 between slots, a minimum length of the slots 602 is determined, such that, when the pin reaches a leading edge of the slot 602, there is sufficient time for the pin to extend into the slot 602 before a trailing edge of the slot 602 is reached. That is, the slot 602 is long enough that the pin does not 'skip over' the slot 602 as it passes by, but rather falls into the slot 602 and arrests the motion of the slotted plate 600 (and the boom element to which it is attached) when the trailing edge of the slot 602 is reached. It will be understood that the speed with which the pin enters the slot 602 is also dependent upon a spring constant of the spring (314, 414, 514) biasing the pin into the slot 602. In a second goal, a maximum size of the slots 602 is selected in order to limit a distance that the boom element travels during a period of time after the boom brake apparatus is engaged, until the boom element's motion is arrested.

A maximum length of the portions 604 between slots 602 is selected such that the relative motion of the two booms may be stopped without the pin tearing through the portion 604 into the next slot 602.

Figure 7:
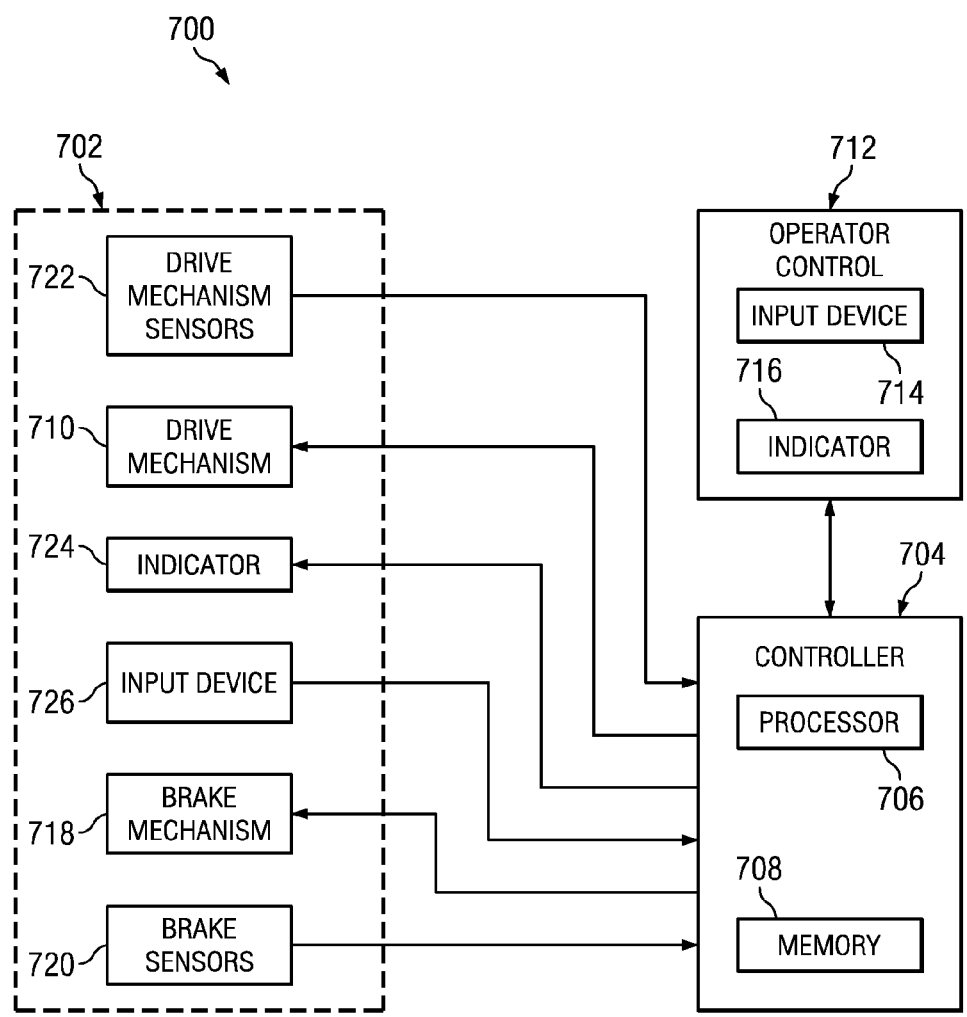
FIG. 7 depicts a block diagram of a boom brake system in accordance with disclosed embodiments.

FIG. 7 depicts a block diagram of a boom brake system 700 in accordance with disclosed embodiments. The boom brake system 700 includes an operator control 712, a controller 702, and an extendable boom 702.

The operator control 712 includes an input device 714 and an indicator 716. A boom operator uses the input device 714 to signal the controller 704 to extend or retract the extendable boom 702. The input device 714 may be a joystick, rocker switch, touch-sensitive screen or other suitable user interface device. The controller 704 uses the indicator 716 to signal the operator a current configuration of a brake mechanism 718 on the extendable boom 702 (engaged or disengaged) and/or a current condition of a drive mechanism 710 on the extendable boom 702 (activated or deactivated). The indicator 716 may be one or more lamps or LEDs, a character display, a graphical display, or other suitable user interface device. The extendable boom 702 also includes an input device 726 and an indicator 724, with similar functionality to the input device 714 and indicator 716. In other embodiments, either the input device 714 or the input device 726 may additionally or alternatively include a button or other suitable switch to use as a 'kill switch' to cause the controller 704 to immediately engage the brake mechanism 718 and stop motion of the extendable boom 702.

The controller 704 includes data processing hardware such as a processor 706 and storage 708 that can include volatile memory, non-volatile memory, optical storage, magnetic storage, or other computer-readable storage media as known to those in the art. The controller 704 can be implemented using one or more physical systems, and may include multiple processors 706 or storage 708; the examples herein refer to these in the singular, but are not intended to limit the physical implementations.

The extendable boom 702 includes the input device 726, the indicator 724, the drive mechanism 710, configured to extend and retract the extendable boom 702, one or more drive mechanism sensors 722, configured to sense one or more conditions of the drive mechanism 710, the brake mechanism 718, configured to arrest extension or retraction of the extendable boom 702, and one or more brake sensors 720, configured to sense one or more conditions of the brake mechanism 718. The controller 704 is configured to receive signals from the drive mechanism sensors 722, the input device 726, and the brake sensors 720, and to send signals to the drive mechanism 710, the indicator 724, and the brake mechanism 718.

When the extendable boom 702 is not extending or retracting, the controller 704 engages the brake mechanism 718 to prevent unpowered extension or retraction of the extendable boom 702. The controller 704 receives one or more signals from the brake sensors 720 indicating that the brake mechanism 718 is in the engaged position. When the operator activates the input device 714 or the input device 726, the controller 704 receives one or more signals indicating the activation and disengages the brake mechanism 718. Once the controller 704 receives a signal from the brake sensors 720 indicating that the brake mechanism 718 is disengaged, the controller 704 activates the drive mechanism 710 to extend or retract the extendable boom 702, as indicated by the operator.

The controller 704 continues to operate the drive mechanism 710 as long as the operator continues to signal continued motion using the input device 714 or the input device 724. When the operator releases or otherwise deactivates the input device 714 or the input device 724, the controller 704 may receive one or more signals indicating the deactivation of the input device 714 and, in response, the controller 704 deactivates the drive mechanism 710 and engages the brake mechanism 718, to bring the extendable boom 702 to a rapid halt.

In other embodiments, the controller 704 may cease receiving signals indicating the activation of the input device 714 and, after a predetermined time period, determine that the operator has released or otherwise deactivated the input device 714. In response to such determination, the controller 704 deactivates the drive mechanism 710 and engages the brake mechanism 718. In all embodiments, the controller 704 continues to engage the brake mechanism 718 as long as the operator is not signaling for extension or retraction of the boom using the input device 714 or the input device 724.

While the extendable boom 702 is in motion, the controller 704 may receive a signal from the drive mechanism sensors 722 indicating a malfunction in the drive mechanism 710, which malfunction may allow the extendable boom 702 to move unconstrained by the drive mechanism 710. The controller 704 reacts to receipt of such a signal by deactivating the drive mechanism 710 and engaging the brake mechanism 718, again to bring the extendable boom 702 to a rapid halt.

The term "activate," when used herein with reference to a brake mechanism according to the disclosure, refers to either or both of engaging and disengaging the brake mechanism.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described.

The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. An extendable boom conveyor system comprising:
a first boom element, including a brake mechanism, the brake mechanism including a first pin configured to be positioned in an engaged position and a disengaged position and configured to extend from a first side of the first boom element when in the engaged position, the brake mechanism also including a second pin configured to extend from a second side of the first boom element in an engaged position;
a second boom element, including a first feature configured to engage the first pin in the engaged position and a second feature configured to engage the second pin in the engaged position to thereby prevent motion of the first boom element relative to the second boom element in at least a first direction; and
an actuator coupled to the first and second pins, the actuator having first and second positions and configured to move the first and second pins to their respective engaged positions when the actuator is moved to its first position and to move the first and second pins to their respective disengaged positions when the actuator is moved to its second position.

2. The extendable boom of claim 1, wherein the first feature is a slot configured to receive the first pin within the slot.

3. The extendable boom of claim 1, wherein the first feature is a feature of a structure mounted to the second boom element.

4. The extendable boom of claim 1, wherein the brake mechanism further includes a biasing mechanism configured to bias the first pin into the engaged position.

5. The extendable boom of claim 1, wherein the actuator is an electric cylinder linear actuator.

6. The extendable boom of claim 1, wherein the actuator is coupled to the first and second pins by respective cables.

7. The extendable boom of claim 1, further comprising a controller configured to control the actuator based on an operator input.

8. An extendable boom conveyor system, comprising:
a first boom element, including a brake mechanism, the brake mechanism including a pin configured to be positioned in an engaged position and a disengaged position;
a second boom element, including a feature configured to engage the pin in the engaged position and prevent motion of the first boom element relative to the second boom element in at least a first direction;
an operator control; and
a controller configured to:
receive an operator signal from the operator control, and
activate the brake mechanism responsive to the operator signal.

9. The extendable boom system of claim 8, wherein the controller is configured to engage the brake mechanism in response to ceasing to receive the operator signal from the operator control.

10. The extendable boom system of claim 8, further comprising a boom drive mechanism configured to move the first boom element relative to the second boom element when activated, wherein the controller is further configured to activate the boom drive mechanism responsive to the operator signal.

11. The extendable boom system of claim 10, wherein the brake mechanism further includes a brake sensor configured to generate a brake sensor signal indicating that the pin is in the disengaged position and the controller is further configured to activate the boom drive mechanism responsive to the brake sensor signal.

12. The extendable boom system of claim 10, wherein the boom drive mechanism includes a drive sensor configured to generate a drive sensor signal based upon a condition of the boom drive mechanism and the controller is further configured to activate the brake mechanism responsive to the drive sensor signal.

13. The extendable boom system of claim 8, wherein the operator control includes an indicator and the controller is further configured to activate the indicator responsive to the position of the pin.

14. The extendable boom system of claim 8, wherein the feature is a feature of a structure mounted to the second boom element.

15. The extendable boom system of claim 8, wherein the brake mechanism further includes an actuator coupled to the pin, the actuator having first and second positions and configured to move the pin to its engaged position when the actuator is moved to its first position and to move the pin to its disengaged position when the actuator is moved to its second position.

16. A method for use with an extendable boom system including first and second boom elements, the method comprising:
receiving an operator signal from an operator control;
activating a brake mechanism responsive to the operator signal, wherein the brake mechanism is coupled to the first boom element and includes a pin,
wherein
activating the brake mechanism includes moving a pin from a disengaged position into an engaged position, and
the second boom element includes a feature configured to engage the pin in the engaged position and prevent motion of the first boom element relative to the second boom element in at least a first direction.

17. The method of claim 16, further comprising moving the first boom relative to the second boom responsive to the operator signal.

18. The method of claim 17, further comprising sensing the pin in the disengaged position and moving the first boom element relative to the second boom element when the pin is in the disengaged position.

19. The method of claim 17, wherein the extendable boom system further includes a boom drive mechanism configured to move the first boom element relative to the second boom element, the method further comprising sensing a condition of the boom drive mechanism and activating the brake mechanism responsive to the condition of the boom drive mechanism.

20. The method of claim 16, further comprising indicating at the operator control a position of the pin, and wherein the feature is a feature of a structure mounted to the second boom element.

* * * * *